United States Patent [19]

Cordiano

[11] Patent Number: 4,794,587
[45] Date of Patent: Dec. 27, 1988

[54] DISK DRIVE LOCK

[76] Inventor: Jimmy D. Cordiano, 8430, Oscar-Roland, Montreal, Quebec, Canada, H2M 9Z7

[21] Appl. No.: 140,719

[22] Filed: Jan. 4, 1988

[51] Int. Cl.$^4$ .......................... G11B 1/04; G11B 5/82; G11B 25/04
[52] U.S. Cl. ..................................... 369/292; 360/86; 360/97.01; 369/77.2
[58] Field of Search ....................... 360/86, 97, 98, 99; 379/292, 77.1, 77.2

[56] References Cited

U.S. PATENT DOCUMENTS

| | | | |
|---|---|---|---|
| 4,481,552 | 11/1984 | Dona et al. | 360/97 |
| 4,669,076 | 5/1987 | Broom et al. | 369/77.1 |
| 4,675,858 | 6/1987 | d'Alayer | 369/77.1 |
| 4,698,707 | 10/1987 | Heys et al. | 360/99 |

*Primary Examiner*—Steven L. Stephan
*Attorney, Agent, or Firm*—Roland L. Morneau

[57] ABSTRACT

A virgin disk is exteriorly secured across an open wall of a casing. When the disk is inserted in the slot of a computer and locked inside by a lever, the casing prevents access to the lever and to the disk and to the removal of the latter from the computer.

8 Claims, 1 Drawing Sheet

U.S. Patent
Dec. 27, 1988
4,794,587
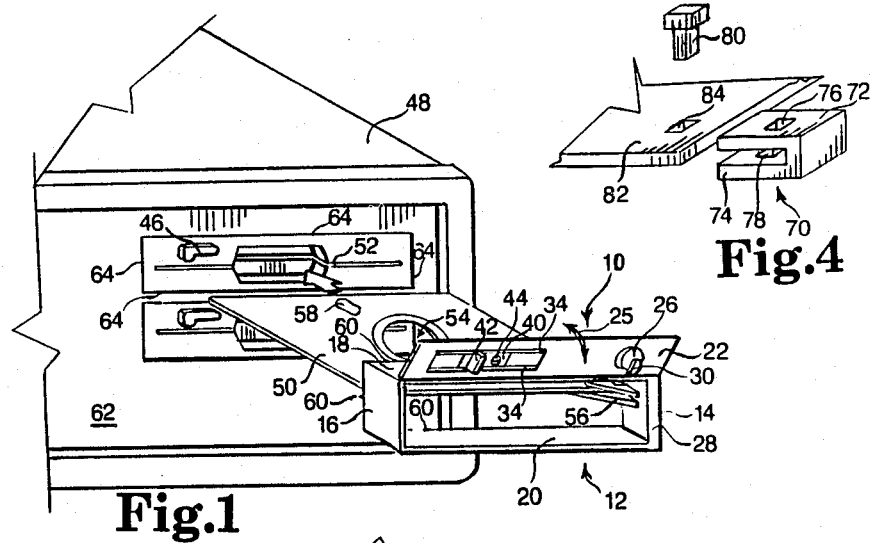
Fig.1
Fig.4
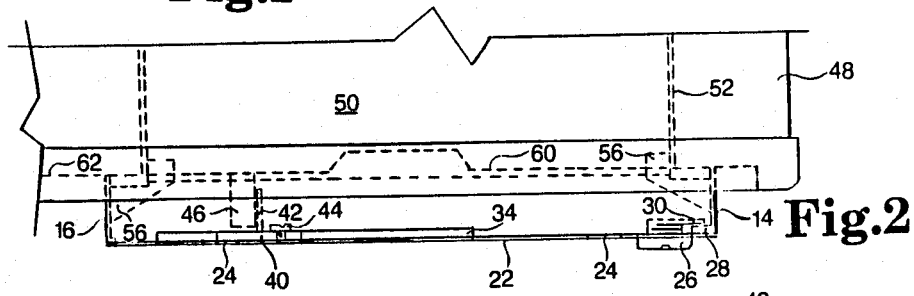
Fig.2
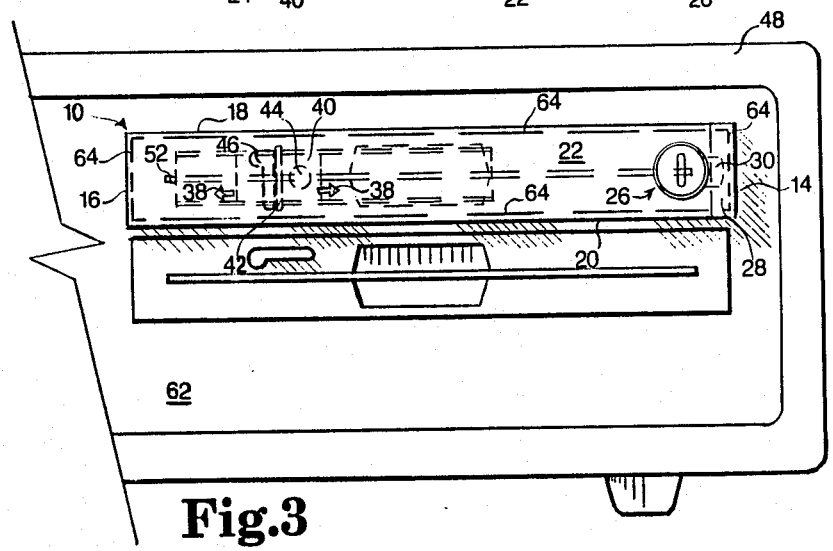
Fig.3

4,794,587

DISK DRIVE LOCK

BACKGROUND OF THE INVENTION

1. Field of the invention

This invention relates to a device for locking a disk installed on a disk operating machine.

It is important that the information produced by a computer or any disk operating machine be accessible only to a selected group of persons and at a specified time. The new device according to the invention locks a virgin disk or a disk without classified information inside a disk operating machine. A covered casing connected to the disk needs to be broken to give access to the operation of the disk operating machine.

2. Prior Art

Various means have been contemplated to prevent unauthorized use of a computer terminal. It has been as elementary as cutting the electrical power supply.

A search of prior patents has revealed U.S. Pat. No. 4,669,281 which discloses an apparatus for protecting the cabling system of a computer to limit the access of the computer to only bona fide users.

SUMMARY OF THE INVENTION

The disk drive lock according to the invention is used with a disk operating machine having a slot on one of its faces for allowing the introduction of a disk and means, adjacent the slot for locking the disk inside the slot. The disk drive lock comprises a casing which hold exteriorly a disk. The casing and the disk have a flat side which are adjacent and about collinear.

The disk is disposed relative to the casing so that when the disk is engaged in the disk operating machine, the side of the casing will abut against the face of the machine to obstructingly seal the disk against external intrusions. The casing has one face which can be opened and locked and which gives access to a means on the machine for locking the disk inside the slot.

BRIEF DESCRIPTION OF THE DRAWING

FIG. 1 is a perspective view of a disk drive lock according to the invention with a partial perspective view of a computer, FIG. 2 is a top plan view of the disk drive lock with a disk inserted in a partial view of the computer, and FIG. 3 is a front plan view of the disk drive lock and the computer shown in FIG. 2, and FIG. 4 is an enlarged view of a different embodiment of the plates for releasably fastening the disk.

DETAILED DESCRIPTION OF THE DRAWINGS

Referring to the drawings, the structure disk drive lock characterizing the present invention is generally indicated by the reference numeral 10.

Disk drive lock 10 comprises a parallelepiped shaped casing 12. The casing 12 has two sidewalls 14 and 16, a top wall 18, a bottom wall 20, and a front door 22. The front door 22 pivots around hinges 24 according to a rotation indicated in FIG. 1 by arrows 25. To lock the front door 22 in a closed position, the user only needs to introduce a key in a lock 26 which is provided with a rotatable tongue 30.

When the tongue 30 becomes horizontal, it rests against the inner surface of flanges 28 secured to the sidewall 14 and inhibits the opening of the front door 22. The casing 12 has no wall opposite the door 22.

A pair of guiding rails 34 are rigidly attached to the inner surface of front door 22. The guiding rails 34 support a plate 40 and allows the latter to slide in the direction of the arrows 38. A stopper plate 42 is rigidly connected to the sliding plate 40. A screw type device 44 is used to block the sliding movement of the plate 40. In a locked position, the stem of screw type device 44 pushes against the inner surface of the front door 22 for immobilizing the sliding plate 40 in the guiding rails 34.

Stopper plate 42 is used to block movement of the disk locking means 46 usually present on a personal computers 48 or similar devices which use information stored on disks such as floppy disk 50. Disk locking means 46 is usually either a lever of the pivot type as illustrated in the figures or of the push button type. Disk locking means 46 is mechanically linked to the driving means which rotates the disk 50. Whenever the user either pushes or pivots locking means 46 in order to secure disk 50 into a slot 52 of a computer 48, a lever system or other suitable means automatically positions the driving head which rotates the disk 50 into a driving hole 54. The rotation of disk 50 enables writing and reading of the data on the disk through a slot 58 by fixed writing and driving heads. Therefore, whenever the user pivots disk locking means 46, it not only inhibits retreival of the disk because of partial blockage of slot 52 as illustrated in FIGS. 2 and 3, but also because of the presence of the driving head in driving hole 54.

According to the invention, the floppy disk 50 is tightly linked to sidewalls 14 and 16 of parallelepiped casing 12 by fastening plates 56.

OPERATION OF THE INVENTION

The main object of this invention is to prevent the use of the computer 48 by selectively limiting access to the disk locking means 46. When the disk 50 which carries no privileged information, is locked in the computer 48. Since edges 60 of parallelepiped casing 12 forming the contour of the open wall, are designed to fit snugly on the front surface 62 of the personal computer 48 either directly outside or inside the rectangle defined by a recess 64. Once door 22 is locked, access to the disk locking means 46 is virtually impossible without damaging either casing 12 or internal components of computer 48. Indeed, when the disk drive lock 10 is in place, casing 12 is rigidly attached to floppy disk 50 by fastening plates 56 while floppy disk 50 is itself secured to personal computer 48 by both disk locking means 46 and the driving head which is located inside driving hole 54. An unauthorized person wanting to remove disk drive lock 10 by simply pulling on it with force would therefore damage one of the above mentioned attachment links either between casing 12 and floppy disk 50 or between floppy disk 50 and personal computer 48. Even though edges 60 are designed to abut snugly against collinear surface 62, one could also try to remove disk drive lock 10 by sliding a thin rigid strip or other similar means between edges 60 and surface 62 in order to unlock disk locking means 46. However, if stopper plate 42 is adequately positioned, this operation remains virtually impossible without damaging either casing 12 or stopper plate 42.

Disk locking means 10 therefore provides a physical barrier which must be altered or damaged by any unauthorized individual trying to illicitly access the protected disk drive. The unauthorized individual therefore becomes liable to more severe legal actions under most legislations than if the disk drive had only been protected by warning signals.

Prior to the first use, stopper plate 52 must be adjusted by sliding the plate 40 so that when front door 22 is closed, stopper plate 42 rests against disk locking means 46 as illustrated in FIGS. 2 and 3. When a push button type disk locking means 46 is used instead of a pivot type, stopper plate 42 can be adjusted to rest over and against the depressed button. Once the initial adjustment is made, the sliding plate 40 is locked in place by screw type device 44 so that further sliding adjustment is only needed if disk lock device 10 is used on a different model of personal computer 48. Disk drive lock device 10 is therefore extremely simple to use since only two additional steps other than the usual steps associated with positioning of the disk for reading and writing operations are needed, namely pivoting of front door 22, and locking of pivotal lock 26. It should be obvious that the door 22 can be locked on the casing 12 by a variety of locking means. Limiting access to disk locking means 46 and therefore preventing unauthorized retraction of disk 50 from slot 52 can be especially usefull in at least two given instances. The first of these instance is when the owner of a personal computer has stored information on what is commonly referred to as a hard disk and wants to limit access to that information. To become operational, most personal computers need to be started up by an operation commonly referred to as "booting".

To "boot" the system, the user must insert a disk commonly referred to as the DOS or Disk Operating System disk in a given slot and then turn on the computer by means of a given switch. In the default mode, most personal computers will look for the information contained on the DOS disk by reading the disk inserted in the drive commonly referred to as the "A" drive which corresponds to a given slot such as slot 52. If the default "booting" drive is not the "A" drive, the user can usually perform a series of operations which can transform drive "A" into the booting drive. Previously, to have access to the data stored on the hard disk, a given individual could simply start up the system and search the hard disk.

If disk lock 10 is installed with a disk other than the DOS disk, the personal computer cannot be started and therefore information stored on the hard disk is inaccessible.

The second instance whereby disk lock device 10 is especially useful is for situations where a floppy disk containing valuable data must be left unattended in a computer. Disk lock device 10 can then prevent the theft of the floppy disk.

Disk 50 may be a virgin disk, i.e. without information or data if it is only intended to prevent access to the computer. However, one can leave an unconfidential message on disk 50, such as "back after lunch" which would appear on the computer.

Although disk 50 has been described as tightly linked to the sidewalls 14 and 16 by fastening plates 56, the disk can be removably fixed because the disk can be sold separately from the casing 12. Any virgin or suitable disk can be used in association with the casing 12.

In FIGS. 1 to 3, the disk 50 is secured to the casing 12 by fastening plates 56. However, the disk can be removably fixed to the casing by clipping means. For instance, the plates 56 may be replaced by a bracket 70 such as shown in FIG. 4. The bracket 70 is made of two superposed connected plates 72 and 74. The plate 72 has an aperture 76 and plate 74 has a recess 76 aligned with each other. The aperture 76 and the recess 78 are shaped to receive a T-shaped pin 80. The disk 82 made for such an arrangement has a perforation 84 suitable to receive the pin 80. The disk 82 can be removably locked in the bracket 70 by inserting the corner of the disk 82 in the bracket 70 and locking it in place with the pin 80. Any disk provided with a suitable perforation and suitable information can be combined with the new casing for performing the desired locking operation.

I claim:

1. A disk drive lock for a disk operating machine having a slot on one of its faces for introducing a disk adapted to be engaged inside said slot, the said machine also having adjacent said slot means for locking said disk inside said slot, the said disk drive lock comprising an elongated casing having two sidewalls, a front wall having a door adapted to be opened, the said casing being opened on its side opposite said front wall, said opposite side having a contour adapted to tightly abut against said face of the disk operating machine around said slot and said means for locking said disk, means on said sidewalls for securely fixing a disk across said opposite side and adjacent said contour and means for securely locking said door to prevent access inside said casing through said front wall, whereby when said disk is mounted on said casing and introduced into said slot and locked in said machine, the casing abuts securely against said face of the machine to prevent access to said locking means and to said disk.

2. A disk drive lock as recited in claim 1, wherein said means for securely locking said door comprise a lock fixed on said door and adapted to engage on one of said sidewalls.

3. A disk drive lock as recited in claim 1, wherein the said means for locking said disk in said slot is a lever rotatably mounted adjacent said slot, the said drive lock comprises a blocking member mounted inside said door and adapted to be located adjacent said lever to prevent said lever from being rotated when the door is closed.

4. A disk drive lock as recited in claim 3, wherein said blocking member is slidingly mounted on said door and means for locking said blocking member.

5. A disk drive lock as recited in claim 1, wherein the casing has a parallelepiped shape.

6. A disk drive lock as recited in claim 1, comprising a disk permanently secured to said sidewalls.

7. A disk drive lock as recited in claim 6, wherein the said disk contains an unconfidential message registered thereon.

8. A disk drive lock as recited in claim 6, wherein said disk has a flat edge and said contour is contiguous with said flat edge.

* * * * *